US008775179B2

(12) United States Patent
Seyfetdinov

(10) Patent No.: US 8,775,179 B2
(45) Date of Patent: Jul. 8, 2014

(54) SPEECH-BASED SPEAKER RECOGNITION SYSTEMS AND METHODS

(75) Inventor: Serge Olegovich Seyfetdinov, Plano, TX (US)

(73) Assignee: Senam Consulting, Inc., Plano, TX (US)

( * ) Notice: Subject to any disclaimer, the term of this patent is extended or adjusted under 35 U.S.C. 154(b) by 811 days.

(21) Appl. No.: 12/775,110

(22) Filed: May 6, 2010

(65) Prior Publication Data

US 2011/0276323 A1 Nov. 10, 2011

(51) Int. Cl.
*G10L 17/00* (2013.01)

(52) U.S. Cl.
USPC .......... 704/246; 704/253; 704/241; 704/231; 704/256.8; 370/250; 370/435; 379/88.02

(58) Field of Classification Search
USPC ......... 704/246, 253, 241, 231, 243, 233, 236, 704/222, 237, 248, 256.2, 255; 370/435, 370/253, 241, 374; 714/736; 379/88.02, 379/199, 189
See application file for complete search history.

(56) References Cited

U.S. PATENT DOCUMENTS

| | | | |
|---|---|---|---|
| 5,465,290 A * | 11/1995 | Hampton et al. .......... | 379/88.02 |
| 6,088,428 A * | 7/2000 | Trandal et al. ............. | 379/88.02 |
| 6,119,084 A * | 9/2000 | Roberts et al. ............. | 704/246 |
| 6,760,701 B2 * | 7/2004 | Sharma et al. ............. | 704/249 |
| 6,978,238 B2 * | 12/2005 | Wohlsen et al. ............ | 704/246 |
| 7,085,721 B1 | 8/2006 | Kawahara et al. | |
| 7,403,766 B2 | 7/2008 | Hodge | |
| 7,447,632 B2 * | 11/2008 | Itou ............................. | 704/247 |
| 7,454,338 B2 | 11/2008 | Seltzer et al. | |
| 8,271,285 B2 * | 9/2012 | Hansen ........................ | 704/270 |
| 2001/0056346 A1 * | 12/2001 | Ueyama et al. .............. | 704/246 |
| 2006/0020458 A1 * | 1/2006 | Kwon et al. .................. | 704/246 |
| 2009/0287489 A1 * | 11/2009 | Savant ......................... | 704/246 |

OTHER PUBLICATIONS

Eamonn J. Keogh and Michael J. Pazzani, Derivative Dynamic Time Warping, in First SIAM International Conference on Data Mining (SDM'2001), 2001, Chicago, Illinois, USA.
Alain De Cheveigne and Hideki Kawahara, Yin, a fundamental frequency estimator for speech and music, Journal of the Acoustical Society of America, Apr. 2002, 1917-1930, vol. 111, Issue 4.
Michael Seltzer, SPHINX III Signal Processing Front End Specification, CMU Speech Group, Aug. 31, 1999.
Fast Fourier Transform Mathworld description, Wolfram Research, Inc., http://mathworld.wolfram.com/FastFourierTransform.html, Retrieved Apr. 23, 2010.

(Continued)

*Primary Examiner* — Vijay B Chawan
(74) *Attorney, Agent, or Firm* — Ross Joyner PLLC; Kenneth T. Emanuelson

(57) ABSTRACT

The illustrative embodiments described herein provide systems and methods for authenticating a speaker. In one embodiment, a method includes receiving reference speech input including a reference passphrase to form a reference recording, and receiving test speech input including a test passphrase to form a test recording. The method includes determining whether the test passphrase matches the reference passphrase, and determining whether one or more voice features of the speaker of the test passphrase matches one or more voice features of the speaker of the reference passphrase. The method authenticates the speaker of the test speech input in response to determining that the reference passphrase matches the test passphrase and that one or more voice features of the speaker of the test passphrase matches one or more voice features of the speaker of the reference passphrase.

19 Claims, 7 Drawing Sheets

(56) References Cited

OTHER PUBLICATIONS

Discrete Fourier Transform Mathworld description, Wolfram Research, Inc., http://mathworld.wolfram.com/DiscreteFourierTransform.html, Retrieved Apr. 23, 2010.

Dynamic Time Warping Wikipedia description, Wikipedia Foundation, Inc., http://en.wikipedia.org/wiki/Dynamic_time_warping, Retrieved Apr. 23, 2010.

Finite Impulse Response Wikipedia description, Wikipedia Foundation, Inc., http://en.wikipedia.org/wiki/Finite_impulse_response, Retrieved Apr. 23, 2010.

Lawrence R. Rabiner and Bernard Gold, Theory and Application of Digital Signal Processing, 1975, pp. 541-572, Prentice Hall, Inc., Englewood Cliffs, New Jersey.

Masatsugu Okazaki, Toshifumi Kunimoto, and Takao Kobayashi, Multi-Stage Spectral Subtraction for Enhancement of Audio Signals, IEEE International Conference on Acoustics, Speech, and Signal Processing, May 2004, pp. II-805-808, vol. 2.

\* cited by examiner

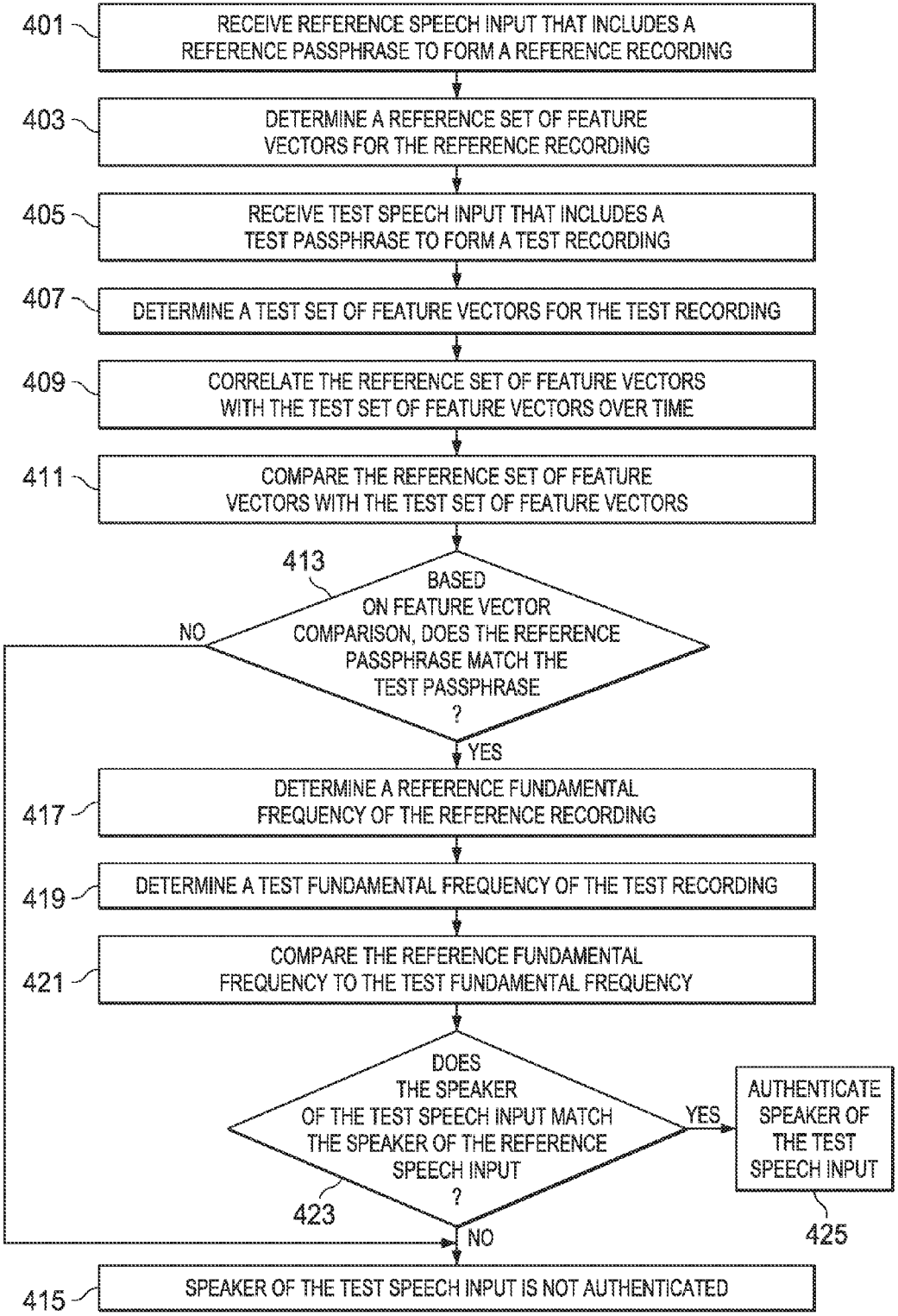

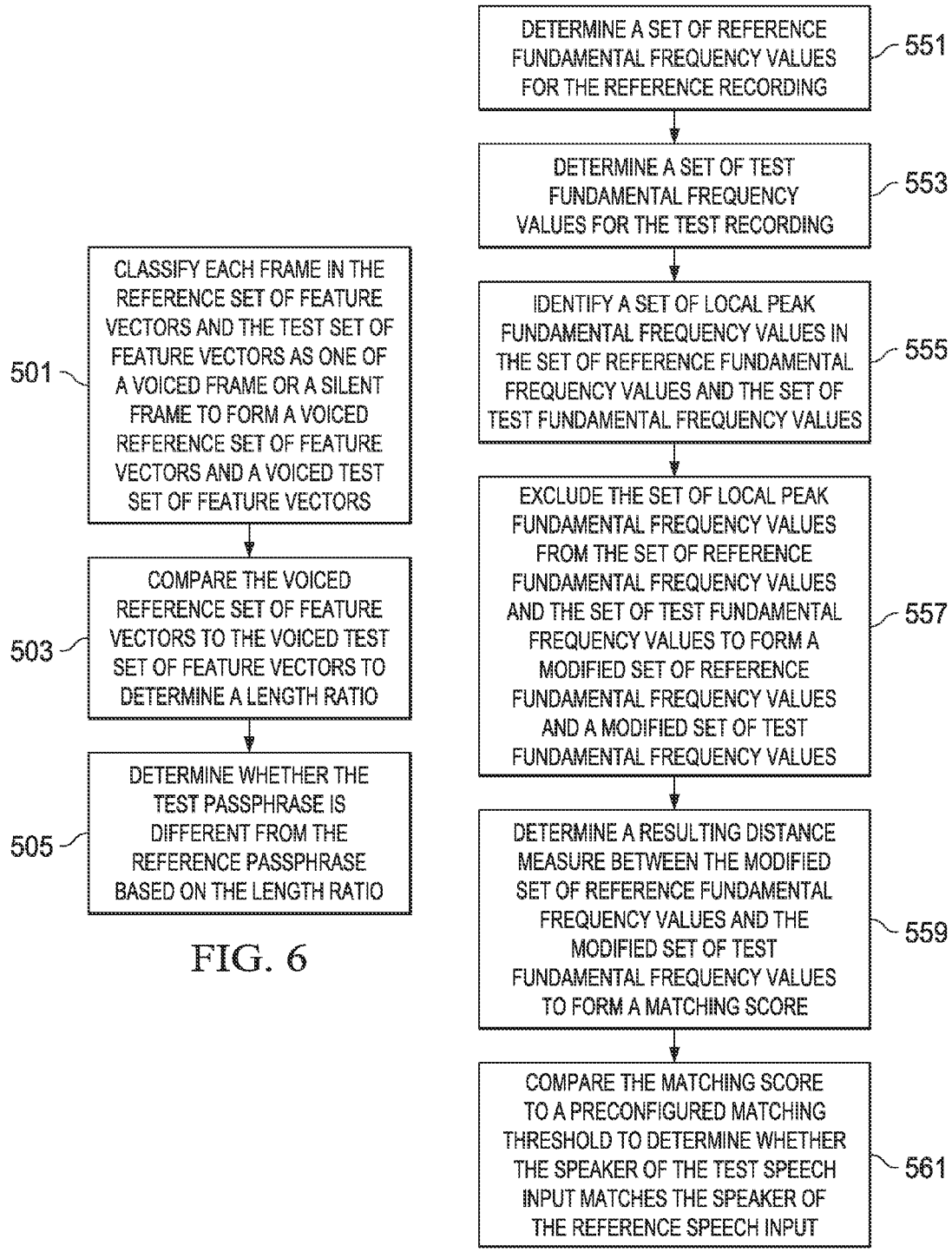

SPEECH-BASED SPEAKER RECOGNITION SYSTEMS AND METHODS

TECHNICAL FIELD OF THE INVENTION

The illustrative embodiments relate generally to speech recognition, and more particularly, to identifying, or authenticating, a speaker using speech-based speaker recognition systems and methods.

BACKGROUND OF THE INVENTION

Speech and voice recognition technologies have found increased usage in many and varied applications as the technology underlying speech recognition has become more advanced. For example, speech recognition technology is used in speech-to-text applications, telephonic interactive voice response (IVR) applications, speech command applications, etc. One potential application involves the use of speech recognition technology to authenticate the identity of a person, or speaker, using his or her speech, including the content of his or her speech.

Current speaker authentication systems may suffer from serious deficiencies, such as unacceptably low accuracy when attempting to identify a speaker based on his or her speech. Such deficiencies can yield devastating results if these systems are used in dangerous environments, such as the authentication of prisoners in a prison for the purpose of determining whether to provide the prisoner with a particular service. The deficiencies in current systems can also adversely affect the service provided by businesses that rely on speech recognition technology to authenticate the customers, or other individuals, associated with their business. Current systems may also lack customizable settings including, but not limited to, the ability to adjust the stringency with which a speaker is authenticated. Due to the lack of customizable settings, current systems may fail to be versatile enough for use in varied environments.

SUMMARY OF THE INVENTION

According to an illustrative embodiment, a method for authenticating a speaker includes receiving reference speech input including a reference passphrase to form a reference recording, and determining a reference set of feature vectors for the reference recording. The reference set of feature vectors have a time dimension. The method also includes receiving test speech input including a test passphrase to form a test recording, and determining a test set of feature vectors for the test recording. The test set of feature vectors have the time dimension. The method also includes correlating the reference set of feature vectors with the test set of feature vectors over the time dimension, and comparing the reference set of feature vectors to the test set of feature vectors to determine whether the test passphrase matches the reference passphrase in response to correlating the reference set of feature vectors with the test set of feature vectors over the time dimension. The method also includes determining a reference fundamental frequency of the reference recording, determining a test fundamental frequency of the test recording, comparing the reference fundamental frequency to the test fundamental frequency to determine whether a speaker of the test speech input matches a speaker of the reference speech input, and authenticating the speaker of the test speech input in response to determining that the reference passphrase matches the test passphrase and that the speaker of the test speech input matches the speaker of the reference speech input.

According to another illustrative embodiment, a speech-based speaker recognition system includes a passphrase recognition module to determine whether a test passphrase spoken as test speech input matches a reference passphrase spoken as reference speech input. The system also includes voice feature recognition module to determine whether a pitch of a speaker of the test passphrase matches a pitch of a speaker of the reference passphrase. The system also includes a recording storage to store a reference speech recording accessible by the passphrase recognition module and the voice feature recognition module. The reference speech recording includes the reference passphrase.

According to another illustrative embodiment, a method for authenticating a speaker includes receiving reference speech input including a reference passphrase to form a reference recording and determining a reference set of feature vectors for the reference recording. The reference set of feature vectors has a time dimension. The method includes receiving test speech input including a test passphrase to form a test recording and determining a test set of feature vectors for the test recording. The test set of feature vectors has the time dimension. The method includes classifying each frame in the reference set of feature vectors and the test set of feature vectors as one of a voiced frame or a silent frame to form a voiced reference set of feature vectors and a voiced test set of feature vectors, comparing the voiced reference set of feature vectors to the voiced test set of feature vectors to determine a length ratio, and determining whether the test passphrase is different from the reference passphrase based on the length ratio. The method also includes correlating the voiced reference set of feature vectors with the voiced test set of feature vectors over the time dimension and comparing the voiced reference set of feature vectors to the voiced test set of feature vectors to determine whether the test passphrase matches the reference passphrase in response to correlating the voiced reference set of feature vectors with the voiced test set of feature vectors over the time dimension. The method includes determining a set of reference fundamental frequency values for the reference recording, determining a set of test fundamental frequency values for the test recording, identifying a set of local peak fundamental frequency values in the set of reference fundamental frequency values and the set of test fundamental frequency values, excluding the set of local peak fundamental frequency values from the set of reference fundamental frequency values and the set of test fundamental frequency values to form a modified set of reference fundamental frequency values and a modified set of test fundamental frequency values, comparing the modified set of reference fundamental frequency values to the modified set of test fundamental frequency values to determine whether a speaker of the test speech input matches a speaker of the reference speech input, and authenticating the speaker of the test speech input in response to determining that the reference passphrase matches the test passphrase and that the speaker of the test speech input matches the speaker of the reference speech input.

BRIEF DESCRIPTION OF THE DRAWINGS

FIG. 5 is a flowchart of a speech-based process for authenticating a speaker according to another illustrative embodiment;

FIG. 6 is a flowchart of a process that utilizes a length ratio to compare a test passphrase to a reference passphrase according to an illustrative embodiment;

FIG. 7 is a flowchart of a process that determines, modifies, and compares reference and test fundamental frequency values according to an illustrative embodiment.

DETAILED DESCRIPTION OF THE INVENTION

Figure 1:
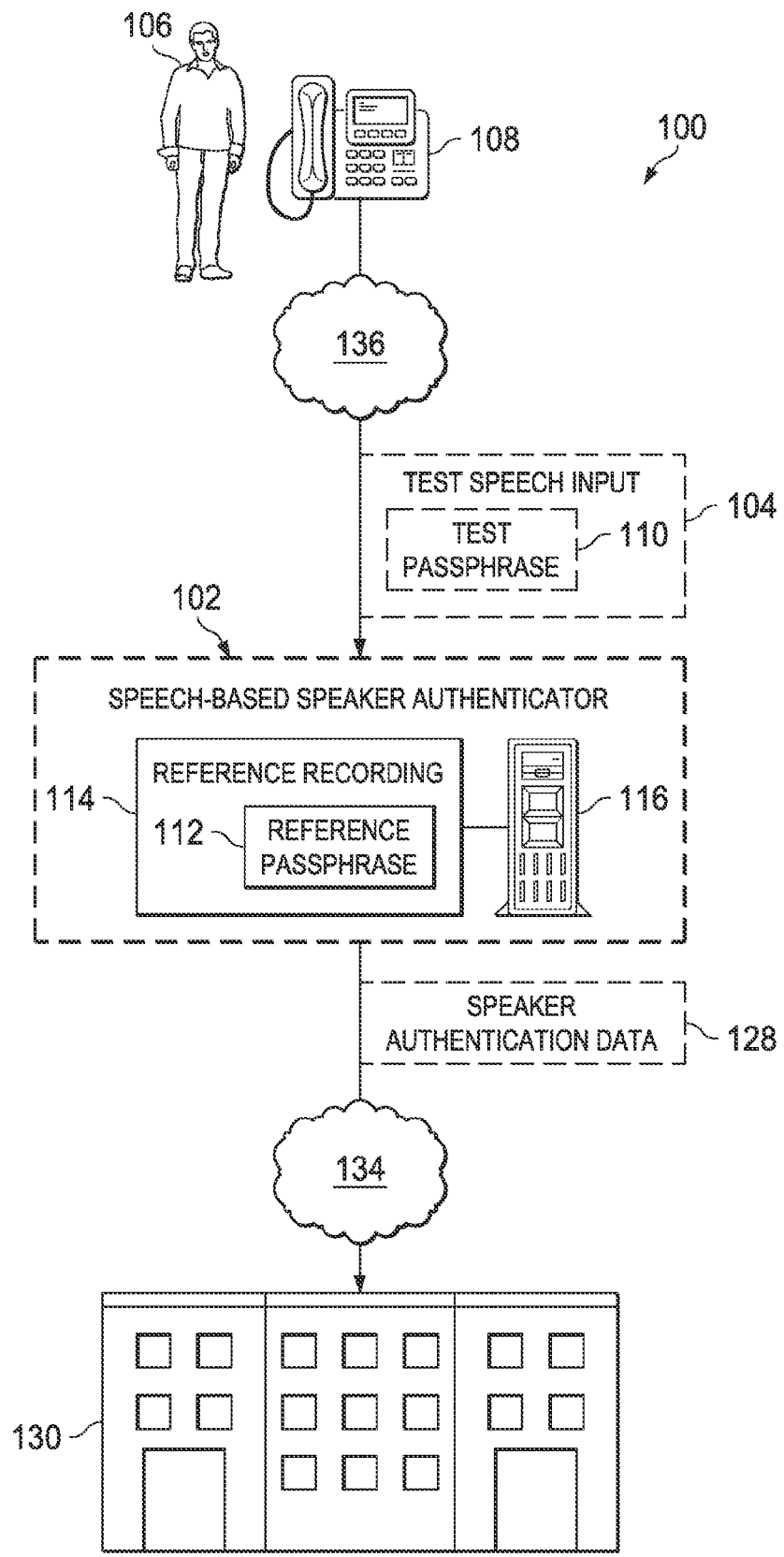
FIG. 1 is a schematic, pictorial representation of a speech-based speaker recognition system according to an illustrative embodiment.
Figure 2:
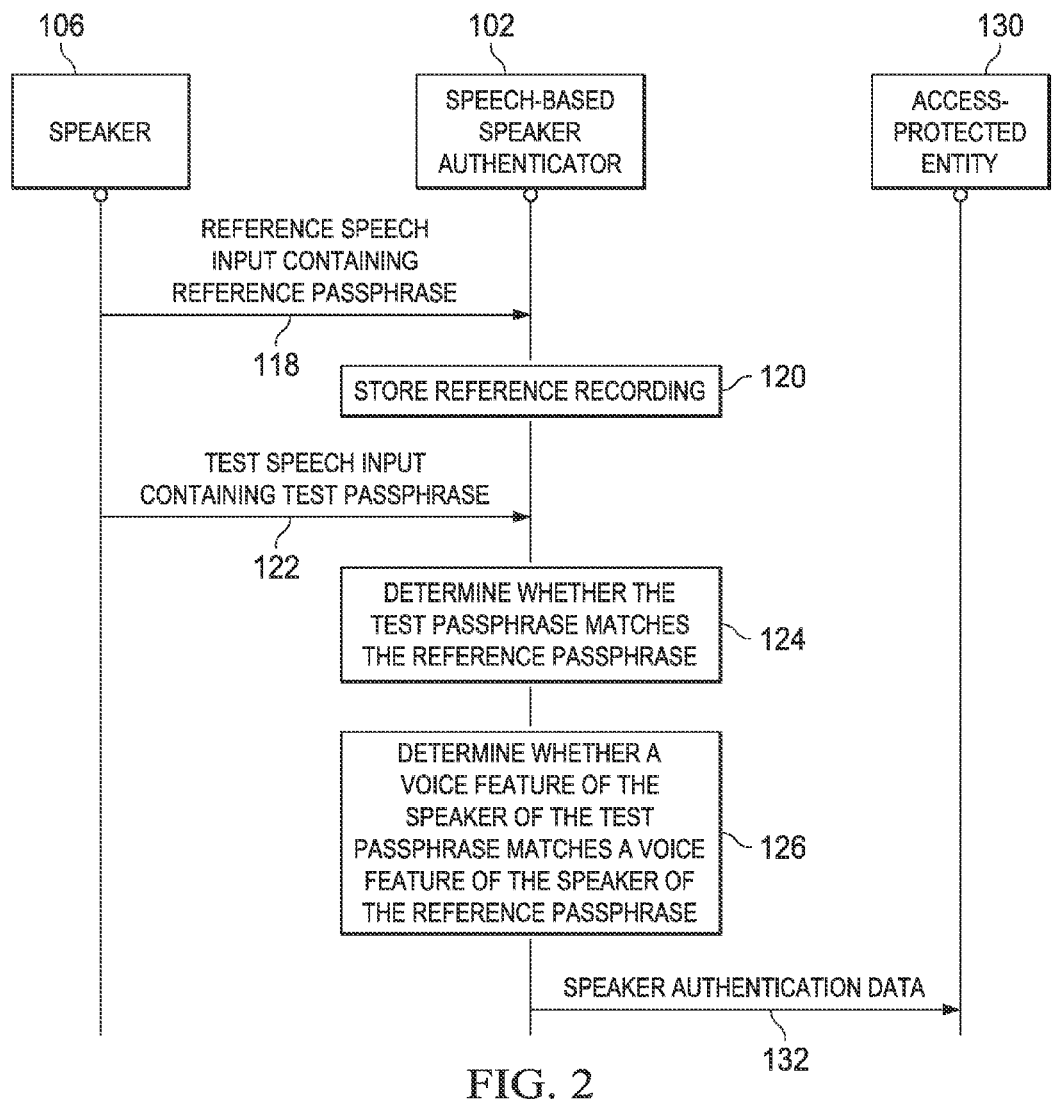
FIG. 2 is a schematic diagram showing the interaction between the elements of the speech-based speaker recognition system in FIG. 1 according to an illustrative embodiment.

Referring to FIGS. 1 and 2, a speech-based speaker recognition system 100 includes a speech-based speaker authenticator 102 that receives test speech input 104 from one or more speakers 106. The test speech input 104 may be received from the speaker 106 via a communication device 108, such as a phone. The test speech input 104 includes a test passphrase 110 that may be compared with a reference passphrase 112 that is part of one or more reference recordings 114. The test passphrase 110 and the reference passphrase 112 may each include one or more words, phonemes, phrases, or any other combination of speech characters. In one non-limiting example, the test passphrase 110 and the reference passphrase 112 may be all or part of the name of the speaker, such as the name of the speaker of the reference passphrase 112 or the name of any person or entity for which authentication is desired. Unless otherwise indicated, as used herein, "or" does not require mutual exclusivity. The reference passphrase 112 may be recorded more than once so that multiple reference recordings 114 may be compared to the test speech input 104.

The reference speech recording may be stored in one or more servers 116 implementing the speech-based speaker authenticator 102. After comparing the test passphrase 110 to the reference passphrase 112, the speech-based speaker authenticator 102 may then determine whether the speaker 106 should be authenticated. The speaker 106 is authenticated if he or she is the same speaker as the speaker of the reference passphrase 112.

With particular reference to FIG. 2, an illustrative embodiment of the interaction between the elements of FIG. 1 is shown in which a speaker, such as the speaker 106, speaks reference speech input containing the reference passphrase 112 to the speech-based speaker authenticator 102 via the communication device 108 (data communication 118). The speech-based speaker authenticator 102 may then store the reference recording 114 that contains the reference passphrase 112 (process 120). The reference recording 114 may be stored, for example, on the server 116 implementing the speech-based speaker authenticator 102.

The reference passphrase 112 may then be used as a standard against which to authenticate any subsequent speakers. Anytime after storing the reference recording 114, the speaker 106 may speak the test speech input 104, which contains the test passphrase 110, to the speech-based speaker authenticator 102 via the communication device 108 (data communication 122). The reference speech input and the test speech input 104 may each be spoken by the same speaker 106, in which case the speaker 106 is authenticated. In another scenario, the speaker 106 of the test speech input 104 may be a different speaker than the speaker of the reference speech input, in which case the speaker 106 is not authenticated.

In one embodiment, the speech-based speaker authenticator 102 uses a two-part authentication process to determine whether the speaker 106 matches the speaker of the reference passphrase 112. The parts of the authentication process may be executed in any order. In one part of the process, the speech-based speaker authenticator 102 may determine whether the test passphrase 110 matches the reference passphrase 112 (process 124). The process 124 focuses primarily on whether the test passphrase 110 is the same, or substantially similar to, the reference passphrase 112, as opposed to whether one or more voice features of the speaker 106 matches one or more voice features of the speaker of the reference passphrase 112. Thus, the process 124 may be considered to be a speaker-independent authentication process. For example, if the reference passphrase 112 is the name of the speaker of the reference passphrase (e.g., John Smith), the process 124 determines whether the test passphrase 110 spoken by the speaker 106 includes all or a portion of the name of the speaker of the reference passphrase. Additional details regarding the process 124 used to determine whether the test passphrase 110 matches the reference passphrase 112 are provided below.

Another part of the authentication process executed by the speech-based speaker authenticator 102 may determine whether a voice feature of the speaker 106 of the test passphrase 110 matches a voice feature of the speaker of the reference passphrase 112 (process 126). The voice feature may be any ascertainable feature of the voice of a speaker, such as pitch, a fundamental frequency estimate, volume, intonation, any mathematical interpretation or representation of the speaker's voice, or other characteristics of the speech frequency spectrum. As opposed to the process 124, which is speaker-independent, the process 126 may be considered speaker-dependent because authentication of the speaker 106 depends upon the particular voice features of the speaker 106 and the speaker of the reference passphrase 112. For example, in the previous example in which the reference passphrase 112 is the name of the speaker of the reference passphrase 112 (e.g., John Smith), the process 126 may compare the pitch of the voice that speaks the reference passphrase 112 with the pitch of the voice of the speaker 106, which speaks the test passphrase 110. In this example, the actual words contained in the reference passphrase 112 and the test passphrase 110 play less of a role than the pitch of the respective voices used to speak the reference passphrase 112 and the test passphrase 110. Additional details regarding the process 126 used to determine whether a voice feature of the speaker 106 matches a voice feature of the speaker of the reference passphrase 112 are provided below.

If the process 124 determines that the test passphrase 110 matches the reference passphrase 112, and the process 126 determines that one or more voice features of the speaker 106 matches one or more voice features of the speaker of the reference passphrase 112, than the speech-based speaker authenticator 102 may determine that the speaker 106 is the same person as the speaker of the reference passphrase 112, thereby authenticating the speaker 106. In another embodiment, the speaker 106 may be authenticated if a match is found by any one of the processes 124 or 126.

In one embodiment, the speech-based speaker authenticator 102 may send speaker authentication data 128 to an access-protected entity 130 after determining whether to authenticate the speaker 106 (data communication 132). The speaker authentication data 128 includes data regarding whether the speaker 106 was authenticated by the speech-based speaker authenticator 102. The access-protected entity 130 may be any entity or service to which access depends upon whether the speaker 106 has been authenticated. Also, the speech-based speaker authenticator 102 may be part of the access-protected entity 130, and may be located on or off the premises of the access-protected entity 130. In another embodiment, the speech-based speaker authenticator 102 is administered, or associated, with an entity or person that is at least partially separate from the access-protected entity 130, such as an authentication service.

By way of non-limiting example, the access-protected entity 130 may be a prison that conditions a service, such as the placement of phone calls by its prisoners, on authenticating the person attempting to place the phone call. In this example, a prisoner in the prison may provide the reference passphrase 112, such as the prisoner's name, which is recorded and stored as the reference recording 114. The prisoner that records the reference passphrase 112 may be associated with an individual account that grants and denies the prisoner certain calling permissions, such as the ability or inability to call certain persons. The calling permissions granted or denied to the prisoner may depend on the prisoner's circumstances, including any restraining orders applicable to the prisoner, or witnesses or lawyers associated with the prisoner. The account associated with the prisoner may also have certain attributes, such as an amount of money with which to place phone calls. Thereafter, any person wishing to place a phone call under the prisoner's account must speak a test passphrase 110 that matches the reference passphrase 112 to the speech-based speaker authenticator 102 so that the speech-based speaker authenticator 102 can verify that the speaker 106 wishing to place the phone call is, in fact, the same person as the prisoner who recorded the reference passphrase 112. The speech-based speaker authenticator 102 may also prevent a prisoner from accessing an account other than his or her own, which may be useful in preventing the prisoner from placing a phone call that would be prohibited by the prisoner's own account, such as a threatening phone call to the victim of his or her crime.

In addition to the non-limiting example given above, the speech-based speaker authenticator 102 may be used in a wide variety of environments in which speaker authentication is advantageous. For example, the access-protected entity 130 may be a business that wishes to prevent unauthorized access to the business's customer accounts. In this case, the customer or potential customer may be asked to provide a passphrase, such as his or her name or other password, in order to access his or her account. Each account may be customized for each customer. If or when the speech-based speaker authenticator 102 authenticates the speaker 106, the speaker will be allowed access to his or her customer account, including any privileges, restrictions, or attributes associated therewith.

The communication device 108 may be any device capable of receiving and transmitting speech. Non-limiting examples of the communication device 108 include landline phones, Voice Over Internet Protocol (VOIP) phones, cellular phones, smart phones, walkie talkies, computers (e.g., desktops, laptops, netbooks, and minicomputers), personal digital assistants, digital music players, digital readers, portable gaming devices, web browsing devices, media players, etc. Although the possible devices represented by the communication device 108 are numerous; in the non-limiting example of FIG. 1, the communication device 108 is a phone.

The techniques, technologies, or media by which the components of the speech-based speaker recognition system 100 intercommunicate are numerous. For example, the speech-based speaker recognition system 100, or any portion thereof, may be part of a personal area network (PAN), a local area network (LAN), a campus area network (CAN), a metropolitan area network (MAP), or any other network type. Data communication medium 134 between the access-protected entity 130 and the speech-based speaker authenticator 102 may be any medium through which data can be communicated. For example, the data communication medium 134 may be wired or wireless data connections, and may utilize a virtual private network (VPN), multi-protocol label switching (MPLS), the Internet, or any other data communication media.

The data communication medium 136 between the speech-based speaker authenticator 102 and the communication device 108 may be of the same or similar type as any of the non-limiting examples provided for the data communication medium 134. In addition to the server 116 on which the speech-based speaker authenticator 102 may be implemented, additional intervening servers may facilitate data communication or storage within the speech-based speaker recognition system 100. Communication between the communication device 108 and the speech-based speaker authenticator 102 may also be via wireless communication. The wireless communication may be facilitated by an intervening base station (not shown). Wireless communication between the communication device 108 and the speech-based speaker authenticator 102 may utilize any wireless standard for communicating data, such as CDMA (e.g., cdmaOne or CDMA2000), GSM, 3G, 4G, Edge, an over-the-air network, Bluetooth, etc.

In one example, the speech-based speaker recognition system 100 may utilize the Internet, with any combination of the data communication media 134, 136 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Figure 3:
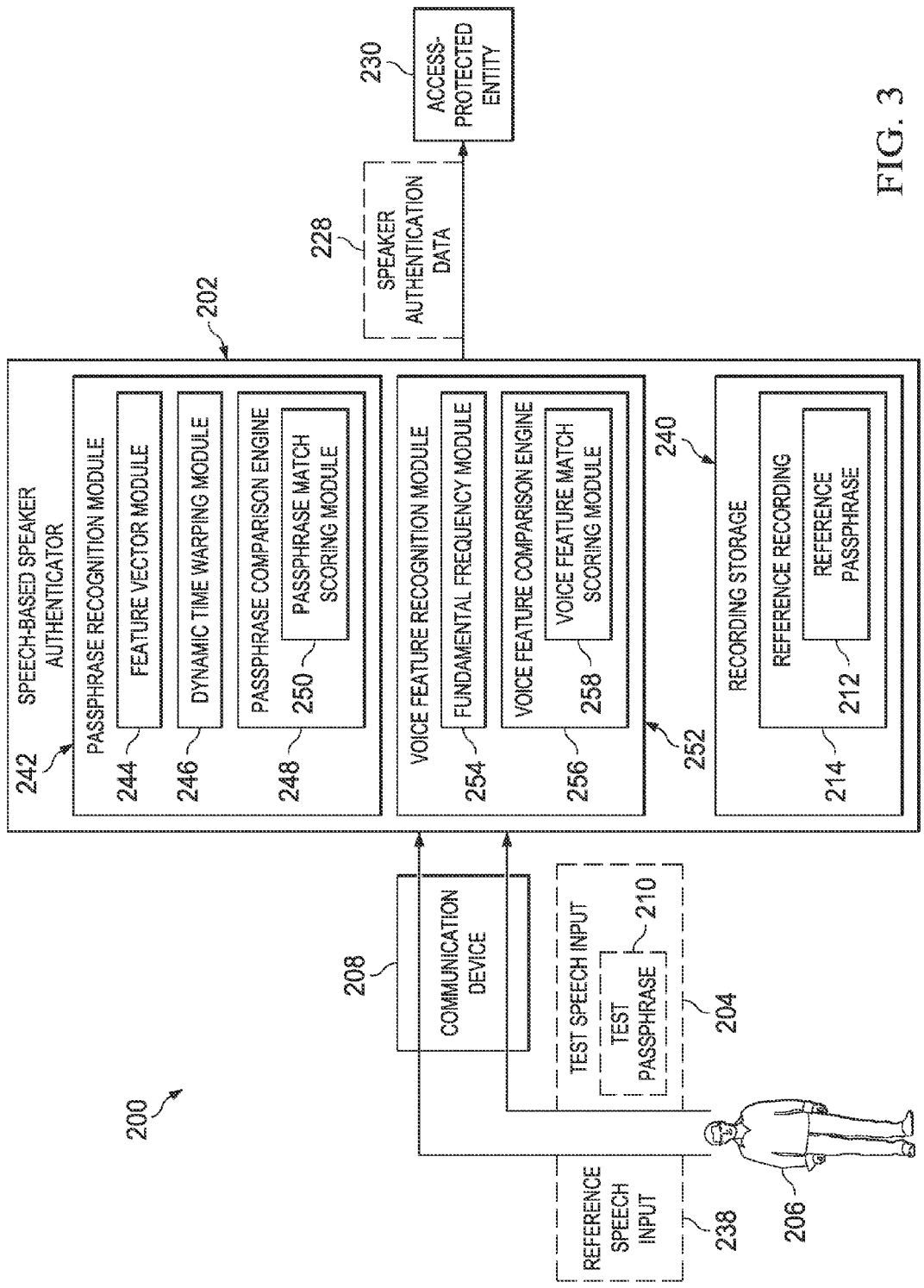
FIG. 3 is a schematic, block diagram of a speech-based speaker recognition system according to an illustrative embodiment.

Referring to FIG. 3, an illustrative embodiment of the speech-based speaker recognition system 200 includes the speech-based speaker authenticator 202, which includes a variety of modules and other elements. Components of FIG. 3 that are analogous to components in FIGS. 1 and 2 have been shown by indexing the reference numerals by 100. As described above, a speaker, such as the speaker 206, may speak reference speech input 238 to the speech-based speaker authenticator 202 via the communication device 208 to form the reference recording 214. The reference recording 214 may be stored in a recording storage 240, which may be implemented in any storage device, such as a hard drive, a memory, a cache, or any other device capable of storing data. The reference passphrase 212 may then be used to verify the identity of any subsequent speaker, which, in the example of FIG. 3, is the speaker 206. The recording storage 240 may also, in one embodiment, store profiles or accounts associated with a speaker of the reference passphrase 212, such as a prisoner account, a customer account, or any other type of account.

The speech-based speaker authenticator 202 includes a passphrase recognition module 242 that determines whether the test passphrase 210, which is spoken as test speech input 204 by the speaker 206, matches the reference passphrase 212. The test speech input 204, as well as the test passphrase 210, may be stored on the recording storage 240 as a test recording. In one embodiment, the passphrase recognition module 242 is a speaker-independent authentication module that seeks to determine a similarity between the test passphrase 210 and the reference passphrase 212 without regard to the speaker from which each is spoken. Numerous methods or techniques may be used to determine whether the test passphrase 210 matches the reference passphrase 212. Examples of such methods may include Hidden Markov models, pattern matching algorithms, neural networks, and decision trees.

In one embodiment, the passphrase recognition module 242 employs a feature vector module 244 and a dynamic time warping module 246 to determine whether the test passphrase 210 matches the reference passphrase 212. In this embodiment, the feature vector module 244 may convert each of the test passphrase 210 and the reference passphrase 212 into a test set of feature vectors and a reference set of feature vectors, respectively, each of which have a time dimension. As used herein, the term "set" encompasses a quantity of one or more. Afterwards, the dynamic time warping module 246 may correlate, or align, the reference set of feature vectors with the test set of feature vectors over the time dimension, such as by using dynamic time warping. After correlating the feature vectors sets, a passphrase comparison engine 248 may compare the test set of feature vectors to the reference set of feature vectors to determine their similarity to one another, and therefore whether the test passphrase 210 matches the reference passphrase 212.

In one embodiment, prior to converting the test passphrase 210 and the reference passphrase 212 into a test set of feature vectors and a reference set of feature vectors, respectively, the feature vector module 244 may pre-process each speech signal in the time domain by applying leading and trailing background noise reduction to both the test passphrase 210 and the reference passphrase 212. For example, this noise reduction pre-process step may use a power subtraction method, power reduction of a background noise, or other process as described in "Multi-Stage Spectral Subtraction for Enhancement of Audio Signals", IEEE International Conference on Acoustics, Speech, and Signal Processing, Volume 2, pp. II-805-808, May 2004 by Masatsugu Okazaki, Toshifumi Kunimoto, and Takao Kobayashi, which is hereby incorporated by reference in its entirety.

In one embodiment, the feature vector module 244, in the process of converting the test passphrase 210 and the reference passphrase 212 into feature vectors sets, places the test passphrase 210 and the reference passphrase 212 in the cepstral domain. The speech signal associated with the test passphrase 210 and the reference passphrase 212 may be sampled by an analog-to-digital converter to form frames of digital values. A Discrete Fourier Transform is applied to the frames of digital values to place them in the frequency domain. The power spectrum is computed from the frequency domain values by taking the magnitude squared of the spectrum. Mel weighting is applied to the power spectrum and the logarithm of each of the weighted frequency components is determined. A truncated discrete cosine transform is then applied to form a cepstral vector for each frame. The truncated discrete cosine transform may convert a forty dimension vector that is present after the log function into a thirteen dimension cepstral vector. A thirteen-dimension cepstral vector may be generated for each of the test passphrase 210 and the reference passphrase 212. The thirteen-dimension cepstral vectors may then be aligned by the dynamic time warping module 246, and compared to one another by the passphrase comparison engine 248.

In another embodiment, the test passphrase 210 and the reference passphrase 212 may each be digital recordings that have an original sampling rate. The test passphrase 210 and the reference passphrase 212 may also be converted into digital format from another format, such as analog. The digital recording containing the test passphrase 210 or the reference passphrase 212 may then be converted from the original sampling rate to a conversion sampling rate. In one example, the digital recording containing the test passphrase 210 or the reference passphrase 212 is converted to a 16-bit, 16 Kilohertz line pulse code modulation format.

Thirteen-dimension Mel Cepstrum feature vectors) may then be calculated for each 25 millisecond window of speech signal with a 10 millisecond frame rate using a Discrete Fourier Transform and one or more elements or processes in the "SPHINX III Signal Processing Front End Specification", Carnegie Mellon University Speech Group, Aug. 31, 1999 by Michael Seltzer, which is hereby incorporated by reference in its entirety. A set of front end processing parameters, each of which may have predetermined or customized values based on the embodiment, may be used by the feature vector module 244 in the feature vector conversion process. In one embodiment, the front end processing, or default, parameters may have the following values:

Sampling Rate: 16000.0 Hertz

Frame Rate: 100 Frames/Sec

Window Length: 0.025625 Sec

Filterbank Type Mel Filterbank

Number of Cepstra: 13

Number of Mel Filters: 40

Discrete Fourier Transform Size: 512

Lower Filter Frequency: 133.33334 Hertz

Upper Filter Frequency: 6855.4976 Hertz

Pre-Emphasis $\alpha$: 0.0

In one embodiment, the 13 Cepstra may include 12 cepstral (spectral) values and one (1st) value measuring the signal energy (or power).

The feature vector module 244 may apply a Finite Impulse Response (FIR) FIR pre-emphasis filter, such as the one below, to the input waveform that corresponds to the test passphrase 210 or the reference passphrase 212:

$$y[n]=x[n]-\alpha x[n-1]$$

$\alpha$ may be user-defined or have the default value. This step may be skipped if $\alpha=0$. A subsequent round of processing may use the appropriate sample of the input stored as a history value. In one embodiment, the pre-emphasis filter may utilize any filter, including an FIR, which allows the filtering out of a part of a frequency spectrum, as described in "Theory and Application of Digital Signal Processing", Prentice Hall, Inc.: Englewood Cliffs, N.J., 1975 by Lawrence R. Rabiner and Bernard Gold, which is herein incorporated by reference in its entirety.

Next, a windowing process, a power spectrum process, a mel spectrum process, and a Mel Cepstrum process may be performed by the feature vector module 244 on a frame basis. In the windowing process, the feature vector module 244 may multiply the frame by a Hamming window, such as the following:

$$w[n] = 0.54 - 0.46\cos\left(\frac{2\pi n}{N-1}\right)$$

wherein N is the length of the frame.

In the power spectrum process, the feature vector module 244 may determine the power spectrum of the frame by performing a Discrete Fourier Transform of length specified by the user, and then computing its magnitude squared. For example, the power spectrum process may employ the following equation:

$$S[k] = (\text{real}(X[k]))^2 + (\text{imag}(X[k]))^2$$

In the mel spectrum process, the feature vector module 244 may determine a mel spectrum of the power spectrum computed above by multiplying the power spectrum by triangular mel weighting filters and integrating the result. The following equation may be employed by the mel spectrum process:

$$\tilde{S}[l] = \sum_{k=0}^{N/2} S[k] M_l[k]$$

$$l = 0, 1, \ldots, L-1$$

In this equation, N is the length of the Discrete Fourier Transform, and L is a total number of triangular mel weighting filters. Regarding the triangular mel weighting factors, the mel scale filterbank is a series of L triangular bandpass filters, which corresponds to a series of bandpass filters with constant bandwidth and spacing on a mel frequency scale. When using a linear frequency scale, this filter spacing is approximately linear up to 1 Kilohertz, and becomes logarithmic at higher frequencies. The following warping function may be used to transform linear frequencies to mel frequencies:

$$mel(f) = 2595 \log\left(1 + \frac{f}{700}\right)$$

With regard to a plot of this warping function, a series of L triangular filters with 50% overlap may be constructed such that they are equally spaced on the mel scale spanning [mel ($f_{min}$), mel($f_{max}$)]. $f_{min}$ and $f_{max}$ may be user-defined or set to the default values.

In the mel cepstrum process, the feature vector module 244 may apply a Discrete Fourier Transform to the natural logarithm of the mel spectrum, calculated in the mel spectrum process, to the obtain the mel cepstrum:

$$c[n] = \sum_{i=0}^{L-1} \ln(\tilde{S}[i]) \cos\left(\frac{\pi n}{2L}(2i+1)\right)$$

$$c = 0, 1, \ldots, C-1$$

C is the number of cepstral coefficients, which may be outputted by the process, and the cepstral coefficients may be 32-bit floating point data. In one embodiment, the resulting sequence of thirteen-dimension feature vectors for each 25 milliseconds of digitized speech samples (25 millisecond frames) with a 10 millisecond frame rate may be stored as a reference set of feature vectors and a test set of feature vectors for the reference recording 214 and the test recording, respectively.

Once a test set of feature vectors and a reference set of feature vectors are obtained for the test passphrase 210 and the reference passphrase 212, respectively, these feature vector sets may be correlated, aligned, or warped with respect to one another along a time dimension so that the passphrase recognition module 242 can better determine similarities between the test passphrase 210 and the reference passphrase 212. A process called dynamic time warping may be used to correlate the test set of feature vectors and the reference of feature vectors with one another. Dynamic time warping may be used to measure the similarity between two sequences which vary in time or speed. Dynamic time warping helps to find an optimal match between two given sequences (e.g., feature vectors that correspond to the test passphrase 210 and the reference passphrase 212) with certain restrictions. In one application of dynamic time warping, the sequences may be "warped" non-linearly in the time dimension to determine a measure of their similarity independent of certain non-linear variations in the time dimension. Dynamic time warping can help to explain variability in the Y-axis by warping the X-axis.

In one embodiment, the reference set of feature vectors and the test set of feature vectors may be represented by two time series Q and C having respective lengths of n and m:

$$Q = q_1, q_2, \ldots, q_i, \ldots, q_n$$

$$C = c_1, c_2, \ldots, c_j, \ldots, c_m$$

In one non-limiting example, each feature vector may represent approximately 10 milliseconds of speech data (with a rate of 100 frames per second).

To correlate, or align, the two sequences using dynamic time warping, the dynamic time warping module 246 may construct an n-by-m matrix, where the ($i^{th}, j^{th}$) elements of the matrix contains the distance $d(q_i, c_j)$ between the two points $q_1$ and $c_j$. A Euclidean distance may be used, such that $d(q_i, c_j) = (q_i - c_j)^2$. Each of the matrix elements (i,j) corresponds to the alignment between the points $q_i$ and $c_j$. The dynamic time warping module 246 may then determine a warping path W. The warping path W is a contiguous set of matrix elements that defines a mapping between Q and C. When the $k^{th}$ element of W is defined as $w_k = (i,j)_k$, the following relation may be used:

$$W = w_1, w_2, \ldots, w_k, \ldots, w_K$$

$$\max(m,n) \leq K < m+n-1$$

In one embodiment, the dynamic time warping module 246 may subject the warping path W to one or more constraints. For example, the dynamic time warping module 246 may require the warping path W to start and finish in diagonally opposite corners cells of the matrix. Such a boundary constraint may be expressed as $w_1 = (1,1)$ and $w_K = (m,n)$. The dynamic time warping module 246 may also restrict the allowable steps in the warping path W to adjacent cells, including diagonally adjacent cells. Such a continuity constraint may be expressed as:

Given $w_k = (a,b)$ then $w_{k-1} = (a',b')$ where a-a'≤1 and b-b'≤1

The dynamic time warping module 246 may also force the points in the warping path W to be monotonically spaced in time. Such a monotonicity constraint may be expressed as:

Given $w_k = (a,b)$ then $w_{k-1} = (a',b')$ where a-a' 0 and b-b' 0

In one embodiment, the dynamic time warping module 246 may use the following equation to minimize the warping cost when determining the warping path W:

$$DTW(Q, C) = \min\left\{ \frac{\sqrt{\sum_{k=1}^{K} w_k}}{K} \right.$$

K may help to compensate for warping paths having different lengths.

The dynamic time warping module 246 may find the warping path with a minimized warping cost by using dynamic programming to evaluate the following recurrence, which defines the cumulative distance $\gamma(i,j)$ as the distance $d(i,j)$ found in the current cell and the minimum of the cumulative distances of the adjacent elements:

$$\gamma(i,j) = d(q_i, c_j) + \min\{\gamma(i-1, j-1), \gamma(i-1, j), \gamma(i, j-1)\}$$

Various methods may be used by the dynamic time warping module 246 to address the problem of singularities, including windowing, slope weighting, and step patterns (slope constraints).

In another embodiment, the dynamic time warping module 246 may use one or more elements of a derivative dynamic time warping process. Derivative dynamic time warping may be useful when two sequences differ in the Y-axis in addition to local accelerations and decelerations in the time axis. In one example, the dynamic time warping module 246 may use one or more elements or processes of the derivative dynamic time warping described in "Derivative Dynamic Time Warping", First SIAM International Conference on Data Mining (SDM'2001), 2001, Chicago, Ill., USA by Eamonn J. Keogh and Michael J. Pazzani, which is hereby incorporated by reference in its entirety.

Derivative dynamic time warping differs from some other types of dynamic time warping, such as the dynamic time warping example given above, in that derivative dynamic time warping does not consider only the Y-values of the data points for which a correlation is sought, but rather considers the higher-level features of "shape". Information about shape is obtained using the first derivative of the sequences.

The dynamic time warping module 246 may generate an n-by-m matrix wherein the $(i^{th}, j^{th})$ element of the matrix contains the distance $d(q_i, c_j)$ between the two points $q_i$ and $c_j$. In contrast to the dynamic time warping example given above, the distance measure $d(q_i, c_j)$ is not Euclidean, but rather the square of the difference of the estimated derivatives of $q_i$ and $c_j$. The following estimate may be used to obtain the derivative:

$$D_x[q] = \frac{(q_i - q_{i-1}) + ((q_{i+1} - q_{i-1})/2)}{2} \quad 1 < i < m$$

This estimate is the average of the slope of the line through the point in question and its left neighbor, and the slope of the line through the left neighbor and the right neighbor. The dynamic time warping module 246 may use exponential smoothing before attempting to estimate the derivatives, especially for noisy datasets. The distance measurement calculated by using the above derivative estimate may then be used by dynamic time warping processes, including the dynamic time warping process described in the previous examples.

In one embodiment, prior to applying the Derivative Dynamic Time Warping method described above, all frames in reference and test passphrases 212, 210, and in particular the reference and test sets of feature vectors, are classified as voiced or silent frames, based on the energy of each frame. In one example, the energy, or power, may be one of the values in the 13 Cepstra discussed above, such as the first dimension value of the 13 Cepstra. An energy threshold may be used to classify a given frame as voiced or silent, and the energy threshold may be configured as a function of the average energy level. For example, each frame in the reference and test sets of feature vectors may be compared to the energy threshold such that frames having an energy level that exceeds the energy threshold (e.g., the average energy level) are classified as voiced frames, while frames having an energy level that is less than the energy threshold are classified as silent frames.

For purposes of classifying the frames as voiced or silent, the test and reference passphrases 210, 212 may be assumed to be similar or identical. Thus, the voiced frames of each of the reference set of feature vectors and test set of feature vectors should be somewhat similar, but not necessarily identical, in length when the test passphrase 210 is the same as the reference passphrase 212. Using this assumption, the passphrase comparison engine 248 may compare the voiced reference set of feature vectors to the voiced test set of feature vectors to determine whether the test passphrase 210 matches the reference passphrase 212. In one particular embodiment, the passphrase comparison engine 248 may determine a length ratio that is ratio of the length of the voiced reference set of feature vectors to the length of the voiced test set of feature vectors. The test passphrase 210 may be determined to match the reference passphrase 212 if the length ratio is within a predetermined ratio, such as 1:1.1, 1:1.5, or any other ratio. On the other hand, the passphrase comparison engine 248 may declare a mismatch between the test passphrase 210 and the reference passphrase 212 if the length ratio exceeds a predetermined ratio. In this manner, the length ratio may be used to guard against attempts to find a match, or actual match determinations, between reference and test feature sets of grossly, or otherwise user-intolerably, different lengths. In addition, the length ratio metric may be provided as a configurable input parameter. Anytime after classifying the frames as voiced or silent, the dynamic time warping module 246 applies the derivative dynamic time warping method only to the sequences of voiced feature sets in reference and test passphases 212, 210.

After processing of the test passphrase 210 and the reference passphrase 212, such as by the feature vector module 244 and the dynamic time warping module 246, the passphrase comparison engine 248 may then compare the test passphrase 210 to the reference passphrase 212 to determine whether the test passphrase 210 matches the reference passphrase 212. As described above, in one embodiment, the test passphrase 210 and the reference passphrase 212 may each be converted to a set of feature vectors and correlated with respect to one another using dynamic time warping, after which the passphrase comparison engine 248 compares the reference set of feature vectors to the test set of feature factors to determine whether the reference passphrase 212 matches the test passphrase 210. If the passphrase comparison engine 248 determines that there is a match between the test passphrase 210 and the reference passphrase 212, the passphrase comparison engine 248 may output such determination to another module in the speech-based speaker authenticator 202, and this determination may be used by the speech-based speaker authenticator 202 to determine whether the speaker 206 is the same speaker that spoke the reference passphrase 212.

The passphrase comparison engine 248 may also include a passphrase match scoring module 250, which allows a user to specify one or more thresholds to determine when a "successful" or "failed" match is found by the passphrase comparison engine 248. For example, the passphrase match scoring module 250 may allow a user to "loosen" or "tighten" the stringency with which the reference set of feature vectors is compared to the test set of feature vectors, such that when the comparison standard is loosened, reference and test sets of feature vectors that are relatively dissimilar will be determined to be a match when a match would not have been declared under a more tightened standard.

In one embodiment, each derivative dynamic time warping process, described in further detail above, outputs a floating point value (e.g., 0.8775). This floating point value may be defined as a minimal cumulative distance $DTW(Q,C)$ normalized by K. $DTW(Q,C)$ and K have been defined above. The passphrase match scoring module 250 may further define scoring weights or coefficients that apply to $DTW(Q,C)$ depending on a cumulative length of the test and reference passphrases 210, 212. These scoring weights determine a threshold to be applied to estimate if a match was 'successful' or 'failed'.

The ability to adjust the stringency with which to declare a match between the test passphrase 210 and the reference passphrase 212 provides versatility to the speech-based speaker authenticator 202. For example, in high-security environments, such as a prison, where there is little margin for error, a higher standard may be desired to minimize the risk that the speaker 206 is falsely identified as the speaker of the reference passphrase 212. In environments where security is less important, the speech-based speaker authenticator 202 may be used to loosen the standard of comparison between the test passphrase 210 and the reference passphrase 212 to minimize scenarios in which a failed match occurs even when the test passphrase 210 is the same as the reference passphrase 212.

In another embodiment, the passphrase match scoring module 250 determines a score based on the similarity between the test passphrase 210 and the reference passphrase 212. The passphrase comparison module 248 may then use the score to determine whether the test passphrase 210 matches the reference passphrase 212. In one embodiment, the score, which, in one example, indicates the similarity between the reference set of feature vectors and the test set of feature vectors, may be compared to a match threshold. Whether the reference set of feature vectors matches the test set of feature vectors, and as a result, whether the reference passphrase 212 matches the test passphrase 210, is based or the comparison between the score and the match threshold. The match threshold may be user-definable to allow the user to adjust the looseness or tightness of the comparison.

By way of non-limiting example, the similarity between a reference set of feature vectors and a test set of feature vectors may be given a score between 0 and 100, where 0 indicates complete dissimilarity and 100 indicates an exact match between the reference and test set of feature vectors. In this example, a user may define a match threshold anywhere from 0 to 100. If the user selects a match threshold of 40, for example, a match between the reference set of feature vectors and the test set of feature vectors will be determined if the score meets or exceeds the match threshold of 40. If the user selects a match threshold of 90, more stringent match criteria will apply, and a match between the reference set of feature vectors and the test set of feature vectors will be found only if the score meets or exceeds 90.

Other types of scoring structures may be employed to allow variability in the match determination conducted by the passphrase comparison engine 248. For example; the passphrase match scoring module 250 may employ two or more reference sets of feature vectors that are converted from two or more respective reference speech inputs 238 containing the same reference passphrase 212. The passphrase match scoring module 250 may compare the test set of feature vectors to the multiple reference sets of feature vectors stored by the recording storage 240. In particular, the passphrase match scoring module 250 may determine a score that corresponds to one of the following scenarios: (1) the test set of feature vectors matches, within a predetermined tolerance, the multiple reference sets of feature vectors, and (2) the test set of feature vectors matches, within a predetermined tolerance, any one of the multiple reference sets of feature vectors, or (3) the test set of feature vectors matches, within a predetermined tolerance, any one of the multiple reference sets of feature vectors in addition to an external boundary condition (e.g., a noisy environment or a reference or test speaker known to be speech-impaired). A match may be declared between the test passphrase 210 and the reference passphrase 212 for any one of these scenarios depending on the desired stringency with which to compare the test passphrase 210 to the reference passphrase 212.

The speech-based speaker authenticator 202 also includes a voice feature recognition module 252, which compares one or more voice features of the speaker 206 to one or more voice features of a speaker of the reference passphrase 212. The voice feature recognition module 252 may be considered to be speaker-dependent since the comparison performed by the voice feature recognition module 252 depends on the voice features of the speakers that are compared.

In one embodiment, the voice feature recognition module 252 includes a fundamental frequency module 254 that estimates, or determines, a fundamental frequency, or pitch, of both the reference recording 214 and the test recording. In voice feature recognition algorithms, the term "pitch" may be used to describe the fundamental frequency of a voice sample. Also, the fundamental frequency may be defined as the rate of vibration of the vocal folds.

Estimation of the fundamental frequency of the test recording containing the test passphrase 210 and the reference recording 214 to determine a test fundamental frequency and a reference fundamental frequency, respectively, may be performed using any technique, such as the autocorrelation methods, including pitch detection estimation (pda), frequency auto-correlation estimation (fxac), autocorrelation coefficient function (acf), normalized autocorrelation coefficient function (nacf), additive estimation, or any other fundamental frequency correlation method.

In one embodiment, estimation of the fundamental frequency of the voice of the speaker 206 of the test passphrase 210 and voice of the speaker of the reference passphrase 212 may be performed using all or part of the YIN fundamental frequency estimation method described in "YIN, a Fundamental Frequency Estimator for Speech and Music", Journal of the Acoustical Society of America, April 2002, 1917-1930, Volume 111, Issue 4 by Alain de Cheveigne and Hideki Kawahara, which is herein incorporated by reference in its entirety. YIN includes several steps, including an initial step that includes an autocorrelation function, and subsequent steps that seek to reduce error rates. In implementing YIN, the fundamental frequency module 254 may determine the autocorrelation function of a discrete speech signal $x_t$, such as a test or reference recording, using the following equation:

$$r_t(\tau) = \sum_{j=t+1}^{t+w} x_j x_{j+\tau}$$

wherein $r_t(\tau)$ is the autocorrelation function of lag $\tau$ calculated at time index t, and W is the integration window size. The autocorrelation method compares the signal to its shifted self. Also, the autocorrelation function is the Fourier transform of the power spectrum, and may be considered to measure the regular spacing of harmonics within that spectrum.

The next step in YIN involves a difference function, in which the fundamental frequency module 254 models the signal $x_t$ as a periodic function with period T, by definition invariant for a time shift of T:

$$x_t - x_{t+T} = 0 \forall t$$

The same is true after taking the square and averaging over a window:

$$\sum_{j=t+1}^{t+w} (x_j - x_{j+T})^2 = 0$$

Conversely, an unknown period may be found by forming the difference function:

$$d_t(\tau) = \sum_{j=1}^{W} (x_j - x_{j+\tau})^2$$

and searching for the values of $\tau$ for which the function is zero. An infinite set of values for which the function is zero exists, and these values are all multiples of the period. The squared sum may be expanded, and the function may be expressed in terms of the autocorrelation function:

$$d_t(\tau) = r_t(0) + r_{t+\tau}(0) - 2r_t(\tau)$$

The first two terms are energy terms. If these first two terms were constant, the difference function $d_t(\tau)$ would vary as the opposite of $r_t(\tau)$, and searching for a minimum of one or the maximum of the other would give the same result. The second energy term also varies with $\tau$, implying that maxima of $r_t(\tau)$ and minima of $d_t(\tau)$ may sometimes not coincide. In one embodiment, the difference function $d_t(\tau)$ may replace the autocorrelation function to yield a lower error, and allow for the application of the subsequent steps in YIN.

In the third step of YIN, the fundamental frequency module 254 may replace the difference function by the "cumulative mean normalized difference function":

$$d'_t(\tau) = \begin{cases} 1, & \text{if } \tau = 0 \\ d_t(\tau) / \left[\left(\frac{1}{\tau}\right) \sum_{j=1}^{\tau} d_t(j)\right] & \text{otherwise.} \end{cases}$$

The cumulative mean normalized difference function is obtained by dividing each value of the old function by its average over shorter-lag values.

In the fourth step of YIN, the fundamental frequency module 254 may set an absolute threshold and choose the smallest value of t that gives a minimum of d' deeper than that threshold. If none is found, the global minimum is chosen instead. If the period is the smallest positive member of a set, the threshold determines the list of candidates admitted to the set, and may be considered to be the proportion of aperiodic power tolerated within a "periodic" signal. By way of illustration, consider the identity:

$$2(x_t^2 + x_{t+T}^2) = (x_t + x_{t+T})^2 + (x_t - x_{t+T})^2$$

Taking the average over a window and dividing by 4, $$1/(2W) \sum_{j=t+1}^{t+W} (x_j^2 + x_{j+T}^2) =$$

$$1/(4W) \sum_{j=t+1}^{t+W} (x_j + x_{j+T})^2 + 1/(4W) \times \sum_{j=t+1}^{t+W} (x_j - x_{j+T})^2,$$

The power of the signal is approximated by the left-hand side. The two terms on the right-hand side constitute a partition of this power. If the signal is periodic with period T, the second of the two terms on the right-hand side is zero, and is unaffected by adding or subtracting periodic components at that period. The second of the two terms on the right-hand side may be interpreted as the "aperiodic power" component of the signal power. When $\tau = T$, the numerator of the cumulative mean normalized difference function described above is proportional to aperiodic power whereas its denominator, average of $d(\tau)$ for $\tau$ between 0 and T, is approximately twice the signal power. Therefore, d'(T) is proportional to the aperiodic/total power ratio. If this ratio is below threshold, a candidate T is accepted into the set. Error rates may not be critically affected based on the exact value of this threshold.

In the fifth step of YIN, the fundamental frequency module 254 may employ parabolic interpolation. In particular, the fundamental frequency module 254 may fit each local minimum of d'($\tau$) and its immediate neighbors by a parabola. The fundamental frequency module 254 may use the ordinate of the interpolated minimum in the dip-selection process. The abscissa of the selected minimum may then serve as a period estimate. An estimate obtained in this way may be slightly biased. To avoid this bias, the abscissa of the corresponding minimum of the raw difference function d($\tau$) is used instead.

For non-stationary speech intervals, it may be found that the estimate fails at a certain phase of the period that usually coincides with a relatively high value of d'($T_t$), wherein $T_t$ is the period estimate at time t. At another phase (time t'), the estimate may be correct and the value of d'($T_{t'}$) smaller. In the sixth step of YIN, the fundamental frequency module 254 takes advantage of this fact by searching around the vicinity of each analysis point for a better estimate. In particular, for each time index t, the fundamental frequency module 254 may search for a minimum of d'$_\theta$($T_\theta$) for $\theta$ within a small interval [t−$T_{max}$/2, t+$T_{max}$/2], wherein $T_\theta$ is the estimate at time $\theta$ and $T_{max}$ is the largest expected period. Based on this initial estimate, the fundamental frequency module 254 may apply the estimation algorithm again with a restricted search range to obtain the final estimate. By way of non-limiting example, using $T_{max}$=25 milliseconds and a final search range of ±20% of the initial estimate, step six of YIN may reduce the error rate to 0.5% (from 0.77%). While step six of YIN may be considered to be associated with median smoothing or dynamic programming techniques, it differs in that it takes into account a relatively short interval and bases its choice on quality rather than mere continuity.

Referring to the steps of YIN as a whole, replacing the autocorrelation function (step 1) by the difference function (step 2) opens the way for the cumulative mean normalization operation (step 3), upon which are based the threshold scheme (step 4) and the measure of d'(T) that selects the best local estimate (step 6). While parabolic interpolation (step 5) may be considered independent from the other steps, it does rely on the spectral properties of the autocorrelation function (step 1). The fundamental frequency module 254 may utilize any combination of these steps of YIN, and in any order.

The voice feature recognition module 252 includes a voice feature comparison engine 256 that compares a voice feature of the speaker 206 of the test passphrase 210 to a voice feature of the speaker of the reference passphrase 212. For example, the voice feature comparison engine 256 may compare the fundamental frequency or pitch of the test speech input 204 (the test fundamental frequency) with the fundamental frequency or pitch of the reference speech input 238 (the reference fundamental frequency) to determine whether the speaker 206 of the test speech input 204 matches the speaker of the reference speech input 238.

Whether a match is found between the test fundamental frequency and the reference fundamental frequency may depend on the level of similarity between these fundamental frequencies that is required before the voice feature comparison engine 256 determines that a match has been found. A voice feature match scoring module 258 may be included in the voice feature comparison engine 256 to give the user some control over the stringency with which the test fundamental frequency and the reference fundamental frequency are compared. In similar manner, the voice feature match scoring module 258 may be used to adjust the stringency with which any other voice feature of the speaker 206 and the speaker of the reference passphrase 212 is compared to determine a match. For example, the voice feature match scoring module 258 may allow a user to "loosen" or "tighten" the stringency with which the reference fundamental frequency is compared to the test fundamental frequency, such that when the comparison standard is loosened, reference and test fundamental frequencies that are relatively dissimilar will be determined to be a match when a match would not have been declared under a more tightened standard. Like the passphrase match scoring module 250 described above, the ability to adjust the stringency with which to declare a match between voice features of the speaker 206 and the speaker of the reference passphrase 212 provides versatility to the speech-based speaker authenticator 202, and allows the speech-based speaker authenticator 202 to be used in a wide variety of environments.

In one embodiment, the voice feature match scoring module 258 may determine a score based on the similarity between the test fundamental frequency and the reference fundamental frequency. The score indicates the similarity between the test fundamental frequency and the reference fundamental frequency. The voice feature match scoring module 258 may then use the score to determine whether the speaker 206 is the same as a speaker of the reference passphrase 212.

For example, the fundamental frequency module 254 may estimate the fundamental frequency, or pitch, for each voiced frame of the reference and test passphrases 212, 210 to form a set of reference fundamental frequency values and a set of test fundamental frequency values, respectively. In one non-limiting example, each voiced frame is 25 milliseconds, although other frame times may be used. Also, the determination of voiced, versus silent, frames in the reference and test passphrases 212, 210 as discussed above may be used.

The two sets of estimated fundamental frequency values yielded by the fundamental frequency module 254 may be compared to determine a matching score. A preconfigured number of local peak fundamental frequency values may be identified and excluded from comparison to avoid the possibility of octave errors that may be inherently present as a result of YIN processing, thus forming a modified set of reference fundamental frequency values and a modified set of test fundamental frequency values. Further, the voice feature comparison engine 256 may determine a resulting distance measure between the original or modified reference and test passphrase fundamental frequency value sets using either Euclidean or Itakura distance metrics, the resulting distance measure representing a matching score between the test and reference passphrases 210, 212. Further, the voice feature comparison engine 256 may use a set of one or more user-definable preconfigured matching thresholds to estimate a "successful" or "failed" match between the speaker 206 and the speaker of the reference passphrase 212. Whether the test fundamental frequency matches the reference fundamental frequency, and as a result, whether the speaker 206 matches the speaker of the reference passphrase 212, is based on the comparison between the score and the match threshold. For example, if the resulting distance measure, or score, exceeds a preconfigured matching threshold, then a mismatch may be declared by the voice feature comparison engine 256.

In another illustrative embodiment, the similarity between the reference fundamental frequency and the test fundamental frequency may be given a score between 0 and 100, where 0 indicates complete dissimilarity and 100 indicates an exact match between the reference fundamental frequency and the test fundamental frequency. In this example, the user may define a match threshold anywhere from 0 to 100. If the user selects a match threshold of 40, for example, a match between the reference fundamental frequency and the test fundamental frequency will be determined if the score meets or exceeds the match threshold of 40. If the user selects a match threshold of 90, more stringent match criteria will apply, and a match between the reference fundamental frequency and the test fundamental frequency will be found only if the score meets or exceeds 90.

The fundamental frequency module 254 may utilize YIN, or any other fundamental frequency or pitch estimation method, to determine the fundamental frequency or pitch of a test recording that includes the test passphrase 210 and the reference recording 214. Other voice features of the speaker 206 and the speaker of the reference passphrase 212 may also be measured and used for comparison purposes.

The voice feature match scoring module 258 may employ two or more reference fundamental frequencies that are converted from two or more respective reference speech inputs 238 containing the same reference passphrase 212. The voice feature match scoring module 258 may compare the test fundamental frequency to the multiple reference fundamental frequencies stored by the recording storage 240. In particular, the voice feature match scoring module 258 may determine a score that corresponds to one of the following scenarios: (1) the test fundamental frequency matches, within a predetermined tolerance, the multiple reference fundamental frequencies, and (2) the test fundamental frequency matches, within a predetermined tolerance, any one of the multiple reference fundamental frequencies, or (3) the test fundamental frequency matches, within a predetermined tolerance, any one of the multiple reference fundamental frequencies in addition to an external boundary condition (e.g., a noisy environment or a reference or test speaker known to be speech-impaired). A match may be declared between the speaker 206 and the speaker of the reference passphrase 212 for, any one of these scenarios depending on the desired stringency with which to compare these speakers.

Although the passphrase comparison engine 248 and the voice feature comparison engine 256 are shown to be separate elements included in each of the passphrase recognition module 242 and the voice feature recognition module 252, respectively, the passphrase comparison engine 248 may be combined into a single module with the voice feature comparison engine 256, and this combined module may be separate or a part of any element of the speech-based speaker authenticator 202.

In one embodiment, if both the passphrase recognition module 242 and the voice feature recognition module 252 determine that a match has been found, the speaker 206 will be authenticated as being the same person that spoke the reference passphrase 212. In particular, if the passphrase recognition module 242 determines that the test passphrase 210 spoken by the speaker 206 matches the reference passphrase 212, and the voice feature recognition module 252 determines that the speaker 206 is the same, or matching, person that spoke the reference passphrase 212 based on a voice feature analysis, then the speech-based speaker authenticator 202 authenticates the speaker 206. In another embodiment, the speech-based speaker authenticator 202 may authenticate the speaker 206 if a match is found by only one of the passphrase recognition module 242 or the voice feature recognition module 252. As indicated above, whether a match is found by either of these modules may be customized by a user to allow for varying levels of comparison stringency, such as by use of the voice feature match scoring module 258 or the voice feature match scoring module 258. For example, the match threshold for each scoring module may differ to customize the weight given to each of the passphrase recognition module 242 and the voice feature recognition module 252.

Whether or not the speaker 206 is authenticated may be included as data in the speaker authentication data 228, which may be sent to the access-protected entity 230 for further processing. In another embodiment, the speech-based speaker authenticator 202 may itself provide access to any product, service, entity, etc. based on whether the speaker 206 is authenticated.

Figure 4:
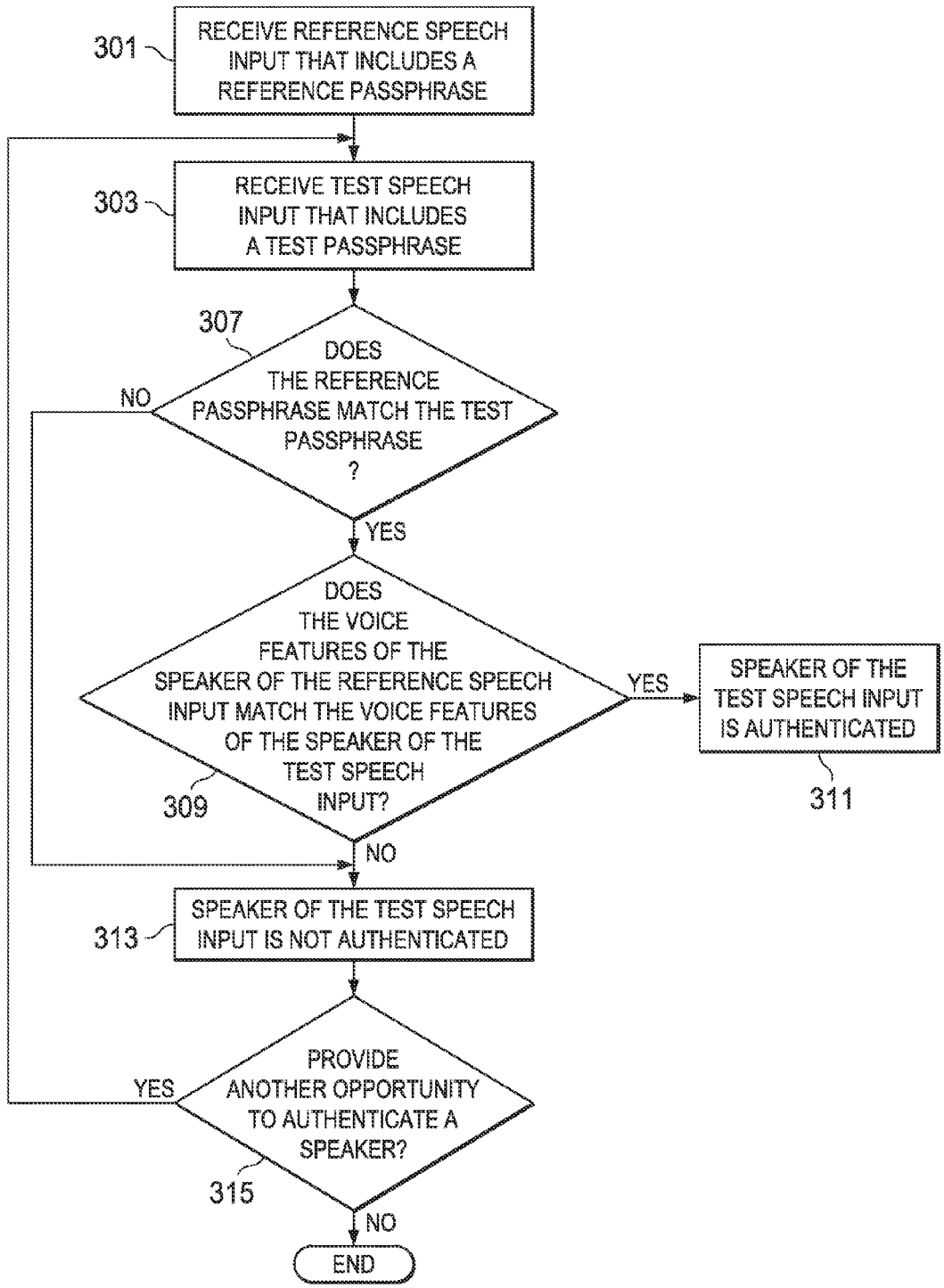
FIG. 4 is a flowchart of a speech-based process for authenticating a speaker according to an illustrative embodiment.

Referring to FIG. 4, an illustrative embodiment of a process for authenticating a speaker that is executable by a speech-based speaker authenticator, such as the speech-based speaker authenticator 102 or 202 in FIG. 1 or 3, respectively, includes receiving reference speech input that includes a reference passphrase (step 301). The process receives test speech input that includes a test passphrase (step 303). The test speech input may be received at any time after the reference speech input is received.

The process determines whether the reference passphrase matches the test passphrase (step 307). If the process determines that the reference passphrase does not match the test passphrase, the process determines that the speaker of the test speech input is not authenticated (step 313). The process then determines whether to provide another opportunity to authenticate a speaker, such as the last speaker to have spoken the test passphrase (step 315). If the process determines to provide another opportunity to authenticate the speaker, the process returns to step 303. If the process determines not to provide another opportunity to authenticate the speaker, the process then terminates.

Returning to step 307, if the process determines that the reference passphrase matches the test passphrase, the process determines whether the voice features of the speaker of the reference speech input match the voice features of the speaker of the test speech input (step 309). If the process determines that the voice features of the speaker of the reference speech input does match the voice features of the speaker of the test speech input, the process determines that the speaker of the test speech input is authenticated (step 311). Returning to step 309, if the process determines that the voice features of the speaker of the reference speech input does not match the voice features of the speaker of the test speech input, the process proceeds to step 313, in which the speaker of the test speech input is not authenticated.

Referring to FIG. 5, an illustrative embodiment of a process for authenticating a speaker that is executable by a speech-based speaker authenticator, such as the speech-based speaker authenticator 102 or 202 in FIG. 1 or 3, respectively, includes receiving reference speech input that includes a reference passphrase to form a reference recording (step 401). The process determines a reference set of feature vectors for the reference recording (step 403). The process receives test speech input that includes a test passphrase to form a test recording (step 405). The process determines a test set of feature vectors for the test recording (step 407). The process correlates the reference set of feature vectors with the test set of feature vectors over time, such as by using dynamic time warping, derivative dynamic time warping, or another dynamic time warping method (step 409). The process compares the reference set of feature vectors with the test set of feature vectors (step 411).

The process determines whether the reference passphrase matches the test passphrase based on the feature vector comparison (step 413). If the process determines that the reference passphrase does not match the test passphrase, the process determines that the speaker of the test speech input is not authenticated (step 415). Returning to step 413, if the process determines that the reference passphrase matches the test passphrase, the process determines a reference fundamental frequency of the reference recording (step 417). The process determines a test fundamental frequency of the test recording (step 419). The process then compares the reference fundamental frequency to the test fundamental frequency (step 421).

The process determines whether the speaker of the test speech input matches the speaker of the reference speech input (step 423). If the process determines that the speaker of the test speech input does not match the speaker of the reference speech input, the process determines that the speaker of the test speech input is not authenticated. Returning to step 423, if the process determines that the speaker of the test speech input matches the speaker of the reference speech input, the process authenticates the speaker of the test speech input (step 425).

Referring to FIG. 6, an illustrative embodiment of a process that utilizes a length ratio to compare a test passphrase to a reference passphrase is shown. The process is executable by the passphrase recognition module 242 in FIG. 3, and may be performed prior to determining the test and reference sets of feature vectors as described in steps 403 and 407 of FIG. 5. The process includes classifying each frame in the reference set of feature vectors and the test set of feature vectors as one of a voiced frame or a silent frame to form a voiced reference set of feature vectors and a voiced test set of feature vectors (step 501). The process includes comparing the voiced reference set of feature vectors to the voiced test set of feature vectors to determine a length ratio (step 503). The process also includes determining whether the test passphrase is different from the reference passphrase based on the length ratio (step 505).

Referring to FIG. 7, an illustrative embodiment of a process that determines, modifies, and compares reference and test fundamental frequency values is shown. The process is executable by the voice feature recognition module 252 in FIG. 3, and provides a non-limiting example of the details of steps 417 through 423 of FIG. 5. The process includes determining a set of reference fundamental frequency values for a reference recording (step 551), and determining a set of test fundamental frequency values for a test recording (step 553). The process includes identifying a set of local peak fundamental frequency values in the set of reference fundamental frequency values and the set of test fundamental frequency values (step 555). The process also includes excluding the set of local peak fundamental frequency values from the set of reference fundamental frequency values and the set of test fundamental frequency values to form a modified set of reference fundamental frequency values and a modified set of test fundamental frequency values (step 557). The process includes determining a resulting distance measure between the modified set of reference fundamental frequency values and the modified set of test fundamental frequency values to form a matching score (step 559). The process also includes comparing the matching score to a preconfigured matching threshold to determine whether the speaker of the test speech input matches the speaker of the reference speech input (step 561).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 8:
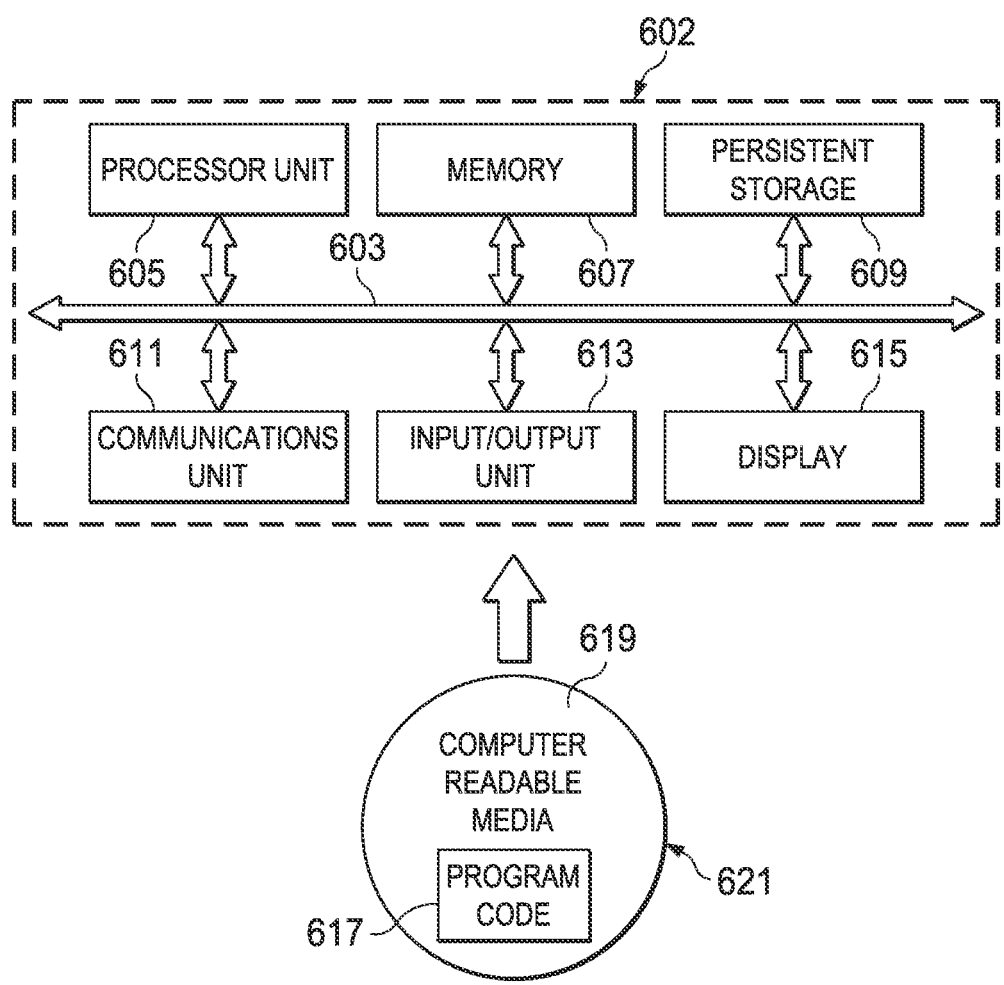
FIG. 8 is a schematic, block diagram of a data processing system in which the illustrative embodiments may be implemented.

Referring to FIG. 8, a block diagram of a computing device 602 is shown in which illustrative embodiments may be implemented. The computing device 602 may implement the speech-based speaker authenticator 102 or 202 in FIG. 1 or 3, respectively. Computer-usable program code or instructions implementing the processes used in the illustrative embodiments may be located on the computing device 602. The computing device 602 includes a communications fabric 603, which provides communications between a processor unit 605, a memory 607, a persistent storage 609, a communications unit 611, an input/output (I/O) unit 613, and a display 615.

The processor unit 605 serves to execute instructions for software that may be loaded into the memory 607. The processor unit 605 may be a set of one or more processors or may be a multi-processor core, depending on the particular implementation. Further, the processor unit 605 may be implemented using one or more heterogeneous processor systems in which a main processor is present with secondary processors on a single chip. As another illustrative example, the processor unit 605 may be a symmetric multi-processor system containing multiple processors of the same type.

The memory 607, in these examples, may be, for example, a random access memory or any other suitable volatile or non-volatile storage device. The persistent storage 609 may take various forms depending on the particular implementation. For example, the persistent storage 609 may contain one or more components or devices. For example, the persistent storage 609 may be a, hard drive, a flash memory, a rewritable optical disk, a rewritable magnetic tape, or some combination of the above. The media used by the persistent storage 609 also may be removable. For example, a removable hard drive may be used for the persistent storage 609. In one embodiment, the recording storage 240 in FIG. 3 may be implemented on the memory 607 or the persistent storage 609.

The communications unit 611, in these examples, provides for communications with other data processing systems or communication devices. In these examples, the communications unit 611 may be a network interface card. The communications unit 611 may provide communications through the use of either or both physical and wireless communication links.

The input/output unit 613 allows for the input and output of data with other devices that may be connected to the computing device 602. For example, the input/output unit 613 may provide a connection for user input through a keyboard and mouse. Further, the input/output unit 613 may send output to a processing device. In the case in which the computing device 602 is a cellular phone, the input/output unit 613 may also allow devices to be connected to the cellular phone, such as microphones, headsets, and controllers. The display 615 provides a mechanism to display information to a user, such as a graphical user interface.

Instructions for the operating system and applications or programs are located on the persistent storage 609. These instructions may be loaded into the memory 607 for execution by the processor unit 605. The processes of the different embodiments may be performed by the processor unit 605 using computer-implemented instructions, which may be located in a memory, such as the memory 607. These instructions are referred to as program code, computer-usable program code, or computer-readable program code that may be read and executed by a processor in the processor unit 605. The program code in the different embodiments may be embodied on different physical or tangible computer-readable media, such as the memory 607 or the persistent storage 609.

Program code 617 is located in a functional form on a computer-readable media 619 and may be loaded onto or transferred to the computing device 602 for execution by the processor unit 605. The program code 617 and the computer-readable media 619 form computer program product 621 in these examples. In one embodiment, the computer program product 621 is the speech-based speaker authenticator 102 or 202 in FIG. 1 or 3, respectively. In this embodiment, the computing device 602 may be the server 116 in FIG. 1, and the program code 617 may include computer-usable program code capable of receiving reference speech input comprising a reference passphrase to form a reference recording, and determining a reference set of feature vectors for the reference recording. The reference set of feature vectors may have a time dimension. The program code 617 may also include computer-usable program code capable of receiving test speech input comprising a test passphrase to form a test recording, and determining a test set of feature vectors for the test recording. The test set of feature vectors may have the time dimension. The program code 617 may also include computer-usable program code capable of correlating the reference set of feature vectors with the test set of feature vectors over the time dimension, and comparing the reference set of feature vectors to the test set of feature vectors to determine whether the test passphrase matches the reference passphrase in response to correlating the reference set of feature vectors with the test set of feature vectors over the time dimension. The program code 617 may also include computer-usable program code capable of determining a reference fundamental frequency of the reference recording, determining a test fundamental frequency of the test recording, and comparing the reference fundamental frequency to the test fundamental frequency to determine whether a speaker of the test speech input matches a speaker of the reference speech input. The program code 617 may also include computer-usable program code capable of authenticating the speaker of the test speech input in response to determining that the reference passphrase matches the test passphrase and that the speaker of the test speech input matches the speaker of the reference speech input.

In another embodiment, the program code 617 may include computer-usable program code capable of receiving reference speech input including a reference passphrase to form a reference recording and determining a reference set of feature vectors for the reference recording. The reference set of feature vectors has a time dimension. The program code 617 may also include computer-usable program code capable of receiving test speech input including a test passphrase to form a test recording and determining a test set of feature vectors for the test recording. The test set of feature vectors has the time dimension. The program code 617 may also include computer-usable program code capable of classifying each frame in the reference set of feature vectors and the test set of feature vectors as one of a voiced frame or a silent frame to form a voiced reference set of feature vectors and a voiced test set of feature vectors, comparing the voiced reference set of feature vectors to the voiced test set of feature vectors to determine a length ratio, and determining whether the test passphrase is different from the reference passphrase based on the length ratio. The program code 617 may also include computer-usable program code capable of correlating the voiced reference set of feature vectors with the voiced test set of feature vectors over the time dimension and comparing the voiced reference set of feature vectors to the voiced test set of feature vectors to determine whether the test passphrase matches the reference passphrase in response to correlating the voiced reference set of feature vectors with the voiced test set of feature vectors over the time dimension. The program code 617 may also include computer-usable program code capable of determining a set of reference fundamental frequency values for the reference recording, determining a set of test fundamental frequency values for the test recording, identifying a set of local peak fundamental frequency values in the set of reference fundamental frequency values and the set of test fundamental frequency values, excluding the set of local peak fundamental frequency values from the set of reference fundamental frequency values and the set of test fundamental frequency values to form a modified set of reference fundamental frequency values and a modified set of test fundamental frequency values, comparing the modified set of reference fundamental frequency values to the modified set of test fundamental frequency values to determine whether a speaker of the test speech input matches a speaker of the reference speech input, and authenticating the speaker of the test speech input in response to determining that the reference passphrase matches the test passphrase and that the speaker of the test speech input matches the speaker of the reference speech input. Any combination of the above-mentioned computer-usable program code may be implemented in the program code 617, and any functions of the illustrative embodiments may be implemented in the program code 617.

In one example, the computer-readable media 619 may be in a tangible form, such as, for example, an optical or magnetic disc that is inserted or placed into a drive or other device that is part of the persistent storage 609 for transfer onto a storage device, such as a hard drive that is part of the persistent storage 609. In a tangible form, the computer-readable media 619 also may take the form of a persistent storage, such as a hard drive or a flash memory that is connected to the computing device 602. The tangible form of the computer-readable media 619 is also referred to as computer recordable storage media.

Alternatively, the program code 617 may be transferred to the computing device 602 from the computer-readable media 619 through a communication link to the communications unit 611 or through a connection to the input/output unit 613. The communication link or the connection may be physical or wireless in the illustrative examples. The computer-readable media 619 also may take the form of non-tangible media, such as communication links or wireless transmissions containing the program code 617.

The different components illustrated for the computing device 602 are not meant to provide architectural limitations to the manner in which different embodiments may be implemented. The different illustrative embodiments may be implemented in a data processing system including components in addition to or in place of those illustrated for computing device 602. Other components shown in FIG. 8 can be varied from the illustrative examples shown.

As one example, a storage device in the computing device 602 is any hardware apparatus that may store data. The memory 607, the persistent storage 609, and the computer-readable media 619 are examples of storage devices in a tangible form.

In another example, a bus system may be used to implement the communications fabric 603 and may be comprised of one or more buses, such as a system bus or an input/output bus. Of course, the bus system may be implemented using any suitable type of architecture that provides for a transfer of data between different components or devices attached to the bus system. Additionally, the communications unit 611 may include one or more devices used to transmit and receive data, such as a modem or a network adapter. Further, a memory may be, for example, the memory 607 or a cache such as found in an interface and memory controller hub that may be present in the communications fabric 603.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method for authenticating a speaker, the method comprising:
   receiving reference speech input comprising a reference passphrase to form a reference recording;
   determining a reference set of feature vectors for the reference recording, the reference set of feature vectors having a time dimension;
   receiving test speech input comprising a test passphrase to form a test recording;
   determining a test set of feature vectors for the test recording, the test set of feature vectors having the time dimension;
   correlating the reference set of feature vectors with the test set of feature vectors over the time dimension;
   comparing the reference set of feature vectors to the test set of feature vectors to determine whether the test passphrase matches the reference passphrase;
   determining a reference fundamental frequency of the reference recording, wherein determining the reference fundamental frequency comprises determining a voice feature of the reference recording as a function of a time period T;
   determining a test fundamental frequency of the test recording, wherein determining the test fundamental frequency comprises determining a voice feature of the test recording as a function of the time period T;
   comparing the reference fundamental frequency to the test fundamental frequency to determine whether a speaker of the test speech input matches a speaker of the reference speech input; and
   authenticating the speaker of the test speech input in response to determining that the reference passphrase matches the test passphrase and that the speaker of the test speech input matches the speaker of the reference speech input;
   wherein the reference set of feature vectors comprises Mel Cepstrum feature vectors, and wherein the test set of feature vectors comprises Mel Cepstrum feature vectors.

2. The method of claim 1, wherein the reference recording and the test recording are digital recordings having an original sampling rate, further comprising:
   determining the reference set of feature vectors for the reference recording after converting the reference recording from the original sampling rate to a conversion sampling rate; and
   determining the test set of feature vectors for the test recording after converting the test recording from the original sampling rate to the conversion sampling rate.

3. The method of claim 1, wherein correlating the reference set of feature vectors with the test set of feature vectors over the time dimension is performed using dynamic time warping.

4. The method of claim 1, wherein correlating the reference set of feature vectors with the test set of feature vectors over the time dimension is performed using a derivative dynamic time warping process, the derivative dynamic time warping process outputting a minimal cumulative distance DTW(Q, C) normalized by K to form a value;
   wherein $$DTW(Q, C) = \min \left\{ \frac{\sqrt{\sum_{k=1}^{K} w_k}}{K} \right\};$$

wherein K is a number of elements in a warping path W;
   wherein $W = w_1, w_2, \ldots, w_k, \ldots, w_K$;

the method further comprising defining a scoring weight that applies to DTW(Q,C) based on a cumulative length of the reference passphrase and the test passphrase, the scoring weight determining a threshold used to determine whether the test passphrase matches the reference passphrase.

5. The method of claim 1, wherein the reference set of feature vectors and the test set of feature vectors each comprise a plurality of frames, further comprising:
   classifying each frame in the reference set of feature vectors and the test set of feature vectors as one of a voiced frame or a silent frame to form a voiced reference set of feature vectors and a voiced test set of feature vectors;
   comparing the voiced reference set of feature vectors to the voiced test set of feature vectors to determine a length ratio; and
   determining whether the test passphrase is different from the reference passphrase based on the length ratio.

6. The method of claim 1, wherein determining the reference fundamental frequency of the reference recording comprises determining a set of reference fundamental frequency values for the reference recording, each of the set of reference fundamental frequency values corresponding to a respective voiced frame in the reference recording;
   wherein determining the test fundamental frequency of the test recording comprises determining a set of test fundamental frequency values for the test recording, each of the set of test fundamental frequency values corresponding to a respective voiced frame in the test recording; and
   wherein comparing the reference fundamental frequency to the test fundamental frequency comprises determining a resulting distance measure between the set of reference fundamental frequency values and the set of test fundamental frequency values to form a matching score, and comparing the matching score to a preconfigured matching threshold to determine whether the speaker of the test speech input matches the speaker of the reference speech input.

7. The method of claim 1, further comprising:
   reducing noise in the reference recording and the test recording prior to determining the reference set of feature vectors for the reference recording and determining the test set of feature vectors for the test recording.

8. A speech-based speaker recognition system comprising:
   a passphrase recognition module to determine whether a test passphrase spoken as test speech input matches a reference passphrase spoken as reference speech input;
   a voice feature recognition module to determine whether a pitch as a function of a time period T of a speaker of the test passphrase matches a pitch as a function of the time period T of a speaker of the reference passphrase; and
   a recording storage to store a reference speech recording accessible by the passphrase recognition module and the voice feature recognition module, the reference speech recording comprising the reference passphrase.

9. The speech-based speaker recognition system of claim 8, wherein the passphrase recognition module comprises a passphrase comparison engine to compare the test passphrase to the reference passphrase to determine whether the test passphrase matches the reference passphrase.

10. The speech-based speaker recognition system of claim 9, wherein the passphrase comparison engine comprises a passphrase match scoring module to determine a score based on similarity between the test passphrase and the reference passphrase, and wherein the passphrase comparison engine determines whether the test passphrase matches the reference passphrase based on the score.

11. The speech-based speaker recognition system of claim 8, wherein the passphrase recognition module comprises:
- a feature vector module for determining a test set of feature vectors for the test passphrase and for determining a reference set of feature vectors for the reference passphrase; and
- a dynamic time warping module to correlate the reference set of feature vectors with the test set of feature vectors over a time dimension;
- wherein the reference set of feature vectors comprises Mel Cepstrum feature vectors, and wherein the test set of feature vectors comprises Mel Cepstrum feature vectors.

12. The speech-based speaker recognition system of claim 8, wherein the voice feature recognition module comprises a voice feature comparison engine to compare the pitch of the speaker of the test passphrase with the pitch of the speaker of the reference passphrase to determine whether the speaker of the test passphrase matches the speaker of the reference passphrase.

13. The speech-based speaker recognition system of claim 12, wherein the voice feature comparison engine comprises a voice feature match scoring module to determine a matching score based on similarity between the pitch of the speaker of the test passphrase with the pitch of the speaker of the reference passphrase, and wherein the voice feature comparison engine determines whether the speaker of the test passphrase matches the speaker of the reference passphrase based on the matching score.

14. The speech-based speaker recognition system of claim 8, the voice feature recognition module comprising a fundamental frequency module to determine the pitch of the speaker of the test passphrase and to determine the pitch of the speaker of the reference passphrase.

15. A method for authenticating a speaker, the method comprising:
- receiving reference speech input comprising a reference passphrase to form a reference recording;
- determining a reference set of feature vectors for the reference recording, the reference set of feature vectors having a time dimension and comprising a plurality of frames;
- receiving test speech input comprising a test passphrase to form a test recording;
- determining a test set of feature vectors for the test recording, the test set of feature vectors having the time dimension and comprising a plurality of frames;
- classifying each frame in the reference set of feature vectors and the test set of feature vectors as one of a voiced frame or a silent frame to form a voiced reference set of feature vectors and a voiced test set of feature vectors;
- comparing the voiced reference set of feature vectors to the voiced test set of feature vectors to determine a length ratio;
- determining whether the test passphrase is different from the reference passphrase based on the length ratio;
- correlating the voiced reference set of feature vectors with the voiced test set of feature vectors over the time dimension;
- comparing the voiced reference set of feature vectors to the voiced test set of feature vectors to determine whether the test passphrase matches the reference passphrase;
- determining a set of reference fundamental frequency values for the reference recording, wherein determining a reference fundamental frequency comprises determining a voice feature of the reference recording as a function of a time period T;
- determining a set of test fundamental frequency values for the test recording, wherein determining a test fundamental frequency comprises determining a voice feature of the test recording as a function of the time period T;
- identifying a set of local peak fundamental frequency values in the set of reference fundamental frequency values and the set of test fundamental frequency values;
- excluding the set of local peak fundamental frequency values from the set of reference fundamental frequency values and the set of test fundamental frequency values to form a modified set of reference fundamental frequency values and a modified set of test fundamental frequency values;
- comparing the modified set of reference fundamental frequency values to the modified set of test fundamental frequency values to determine whether a speaker of the test speech input matches a speaker of the reference speech input; and
- authenticating the speaker of the test speech input in response to determining that the reference passphrase matches the test passphrase and that the speaker of the test speech input matches the speaker of the reference speech input;
- wherein the reference set of feature vectors comprises Mel Cepstrum feature vectors, and wherein the test set of feature vectors comprises Mel Cepstrum feature vectors.

16. The method of claim 15, wherein classifying each frame in the reference set of feature vectors and the test set of feature vectors as one of the voiced frame or the silent frame comprises classifying a given frame in the reference set of feature vectors and the test set of feature vectors as the voiced frame when an energy level of the given frame exceeds an energy threshold.

17. The method of claim 15, wherein correlating the reference set of feature vectors with the test set of feature vectors over the time dimension is performed using a derivative dynamic time warping process, wherein the derivative dynamic time warping process is applied to the voiced reference set of feature vectors and the voiced test set of feature vectors; and wherein determining a set of reference fundamental frequency values for the reference recording and determining a set of test fundamental frequency values for the test recording is performed using a YIN process, wherein the YIN process is applied to the reference recording and the test recording.

18. The method of claim 15, wherein determining whether the test passphrase is different from the reference passphrase based on the length ratio comprises determining that the test passphrase differs from the reference passphrase in response to determining that the length ratio exceeds a predetermined ratio.

19. The method of claim 15, wherein comparing the modified set of reference fundamental frequency values to the modified set of test fundamental frequency values comprises:
- determining a resulting distance measure between the modified set of reference fundamental frequency values and the modified set of test fundamental frequency values to form a matching score; and
- comparing the matching score to a preconfigured matching threshold to determine whether the speaker of the test speech input matches the speaker of the reference speech input.

* * * * *